United States Patent [19]
Thomas

[11] Patent Number: 6,085,462
[45] Date of Patent: Jul. 11, 2000

[54] MOLDED PLANT TRAY

[75] Inventor: Berl M. Thomas, Bradenton, Fla.

[73] Assignee: Speedling, Inc., Sun City, Fla.

[21] Appl. No.: 08/295,118

[22] Filed: Aug. 24, 1994

[51] Int. Cl.[7] .................................................. A01G 9/02
[52] U.S. Cl. .................................................. 47/87; 47/86
[58] Field of Search ............................................. 47/87, 86

[56] References Cited

U.S. PATENT DOCUMENTS

| 3,667,159 | 6/1972 | Todd . | |
|---|---|---|---|
| 5,274,953 | 1/1994 | Nicholson | 47/87 |

FOREIGN PATENT DOCUMENTS

| 2509125 | 1/1983 | France | 47/86 |
|---|---|---|---|
| 2318187 | 11/1974 | Germany | 47/87 |
| 1252929 | 11/1971 | United Kingdom | 47/86 |
| 1426313 | 2/1976 | United Kingdom | 47/86 |
| 1511256 | 5/1978 | United Kingdom . | |
| 2074433 | 11/1981 | United Kingdom | 47/87 |
| 2088186 | 1/1982 | United Kingdom | 47/87 |

*Primary Examiner*—Michael J. Carone
*Attorney, Agent, or Firm*—Jacobson, Price, Holman & Stern, PLLC

[57] ABSTRACT

A molded plant tray is provided in the form of a unitary molded plastic member formed of relatively light foamed plastic and having downwardly extending tapered plant cells for receiving planting medium in which individual seedlings are grown. The plant tray is provided with integral drive member receiving groove means in the form of U-shaped grooves along bottom portions of intermediate walls that define the plant cells. An alignment groove can also be provided perpendicular to the drive member receiving groove means and bisecting the length of the drive member receiving groove means for accurate positioning of the plant tray relative to drive members. In a second embodiment a relatively hard plastic insert is molded, manufactured or adhesively secured to create a dual body tray in the molded plastic member and defines the plant cells.

5 Claims, 5 Drawing Sheets

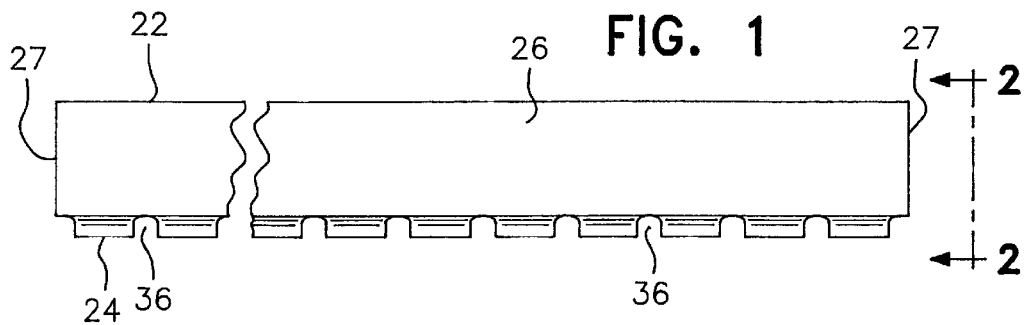
FIG. 1
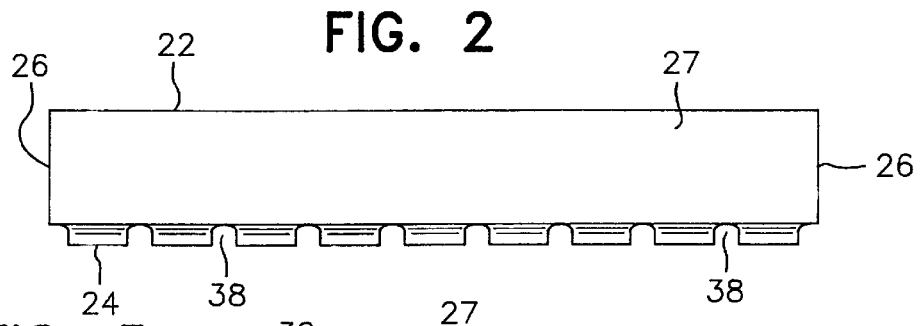
FIG. 2
FIG. 3
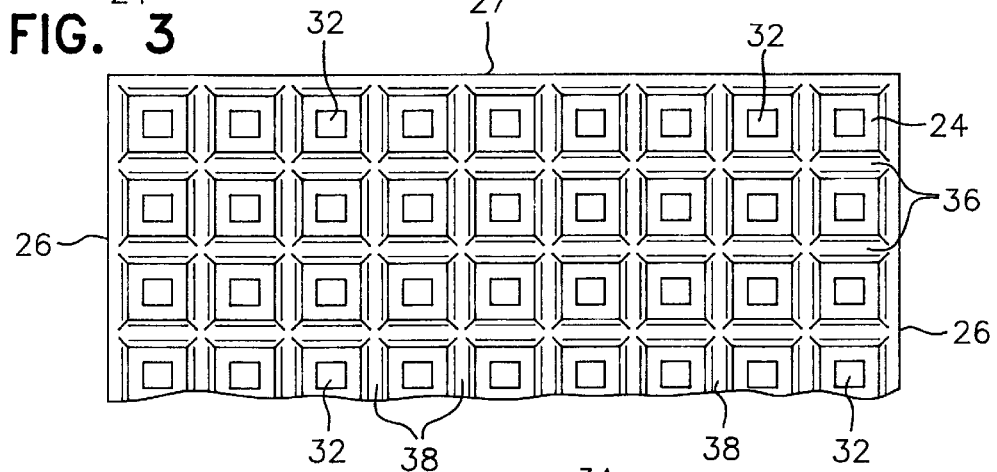
FIG. 4
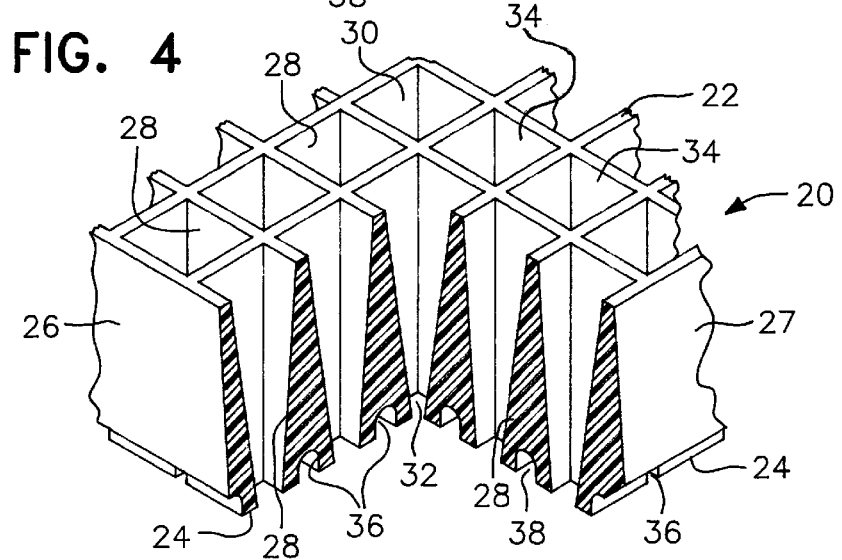

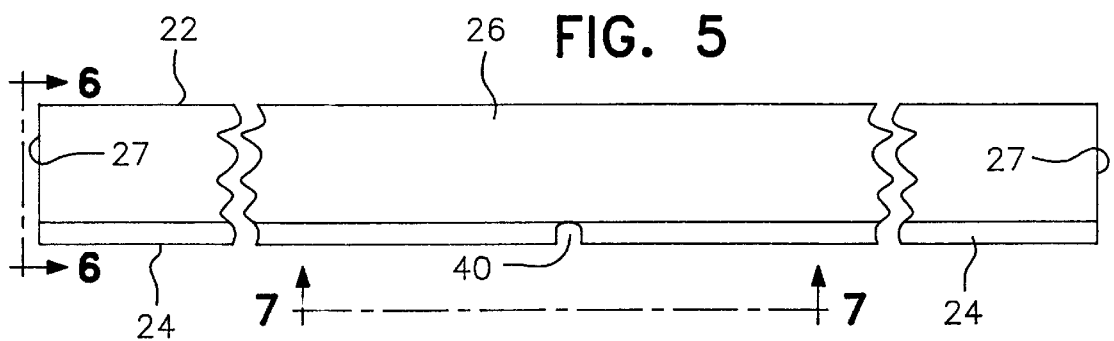
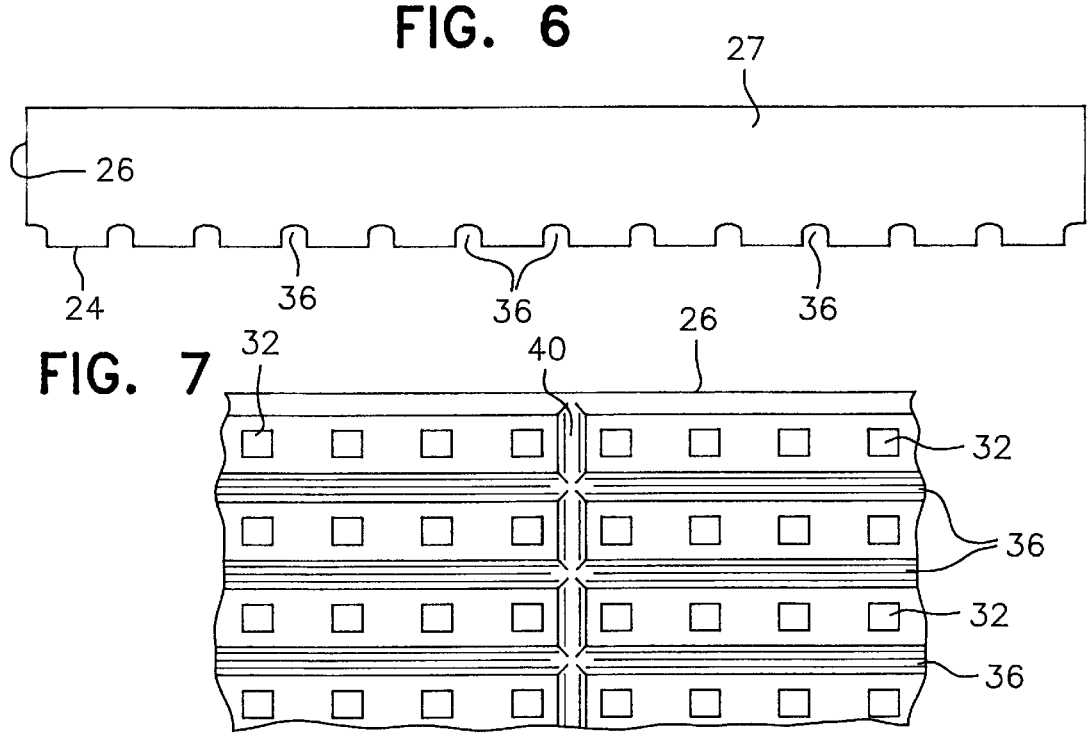
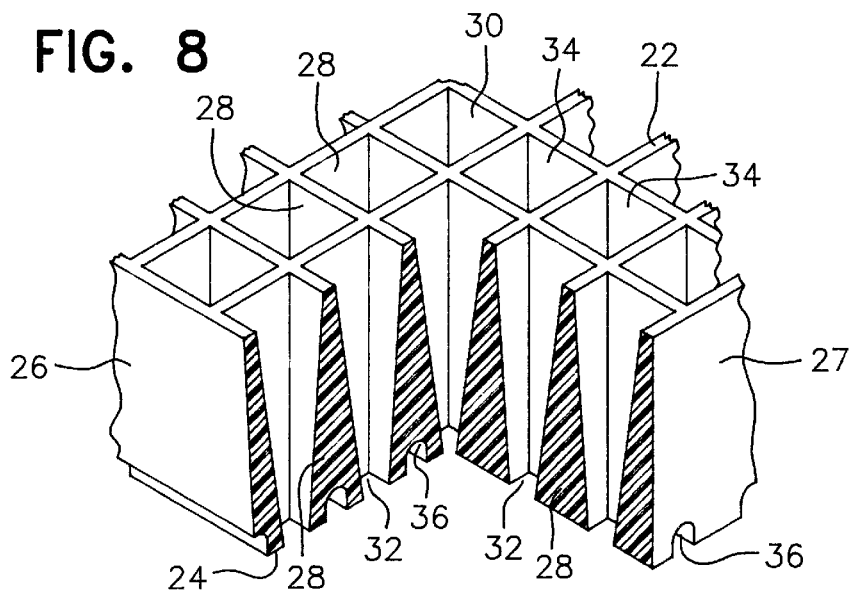

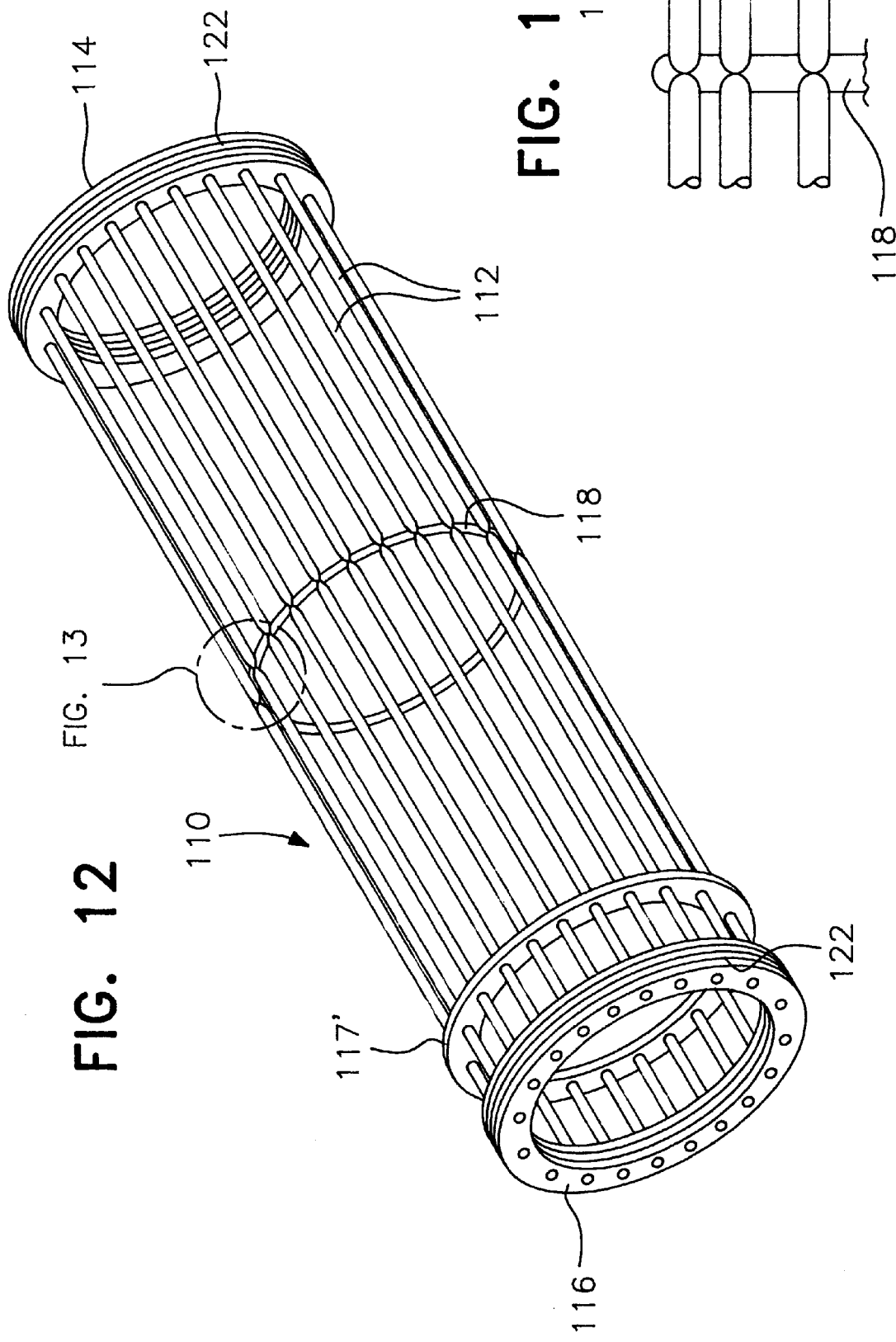

MOLDED PLANT TRAY

BACKGROUND OF THE INVENTION

1. Field of the Invention

The present invention relates to the field of horticultural containers for use with automatic transplanters. More specifically, the invention relates to a seedling flat which is provided with integral means for driving the seedling flat into a position for the ejection of seedlings from the seedling flat.

2. Related Art

Reusable seedling flats or plant trays (wherein the two terminologies are used interchangeably in the art and in this specification) are known in the art, however seedling flats for use with automatic transplanters have had the inherent disadvantage of requiring molded plastics of relatively high degree of hardness in order to provide sufficient strength and rigidity for use with automatic transplanters. The use of relatively inexpensive and light weight expanded polystyrene foam for the plant trays has not been possible due to the insufficient strength of the expanded polystyrene for use with previous methods of indexing the planting tray into position for ejection of seedlings. Another inherent disadvantage of existing plant trays is the lack of a means for consistent accurate positioning of the plant trays relative to the automatic transplanting mechanism to ensure proper ejection of seedlings from the plant trays.

SUMMARY OF THE INVENTION

The object of the present invention is to provide a multi-cell plant tray which is economical and light weight in that it can be constructed from expanded polystyrene, and yet is of sufficient strength for automatic indexing into position for ejection of seedlings from the plant tray. A further object of the invention is to provide means for ensuring consistent and accurate positioning of the plant tray relative to an automatic transplanting mechanism for rapid, repetitive ejection of seedlings from the plant tray. The plant tray includes a main body member consisting of a unitary molding of plastic material having a top surface, a bottom surface and a plurality of side walls that extend between the top and bottom surfaces. A plurality of intermediate walls interconnect the side walls and are positioned in substantially perpendicular relationship to the side walls. A plurality of open ended, pyramid shaped plant cells are defined in between the intermediate walls and the side walls. The plant cells are arranged in a rectangular grid and each include a drain hole located at the bottom surface of the main body member and a plant medium receiving opening located at the top surface of the main body member. The lower portions of the intermediate walls and the side walls adjacent the bottom surface of the main body member define drive member receiving means and alignment means. These drive member receiving means and alignment means are provided for interaction with drive members and an alignment disk or ring provided on an automatic transplanter as described in copending PCT patent application serial number PCT/US94/08783 which is herein incorporated by reference. The drive member receiving means constitute a plurality of parallel U-shaped grooves each having a central axis and being located with their central axes spaced equidistant from each other and equidistant from respective drain hole center lines positioned in between the drive member receiving means. The alignment means constitutes a U-shaped groove having a central axis perpendicular to the central axis of the drive member receiving means and located equidistant from two parallel side walls of the main body member.

Each of the plant cells defined within the main body member of the molded plant tray constitutes a downwardly tapered receptacle in the shape of an inverted pyramid whose major lower portion defines the drain hole and whose major upper portion defines the plant medium receiving opening which is surrounded by a rim formation of uniform width common to adjoining plant cells and formed as a rectangular grid or lattice locating the plant cells.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 1 illustrates a side elevation view of one of the embodiments of the molded plant tray.

FIG. 2 illustrates an end elevation view of the molded plant tray of FIG. 1, looking in the direction of arrows 2—2 of FIG. 1.

FIG. 3 illustrates a bottom plan view of the molded plant tray of FIG. 1.

FIG. 4 illustrates a perspective view of a portion of the molded plant tray shown in FIG. 1.

FIG. 5 illustrates a side elevation view with portions removed to illustrate a second embodiment of the molded plant tray.

FIG. 6 illustrates an end elevation view of the molded plant tray of FIG. 5 taken in the direction of arrows 6—6 of FIG. 5.

FIG. 7 illustrates a partial bottom plan view of the molded plant tray of FIG. 5 taken in the direction of arrows 7—7 of FIG. 5.

FIG. 8 illustrates a perspective view of a portion of the molded plant tray shown in FIG. 5.

FIG. 12 is a perspective view of the indexing drum shown in section in FIG. 11.

FIG. 13 is an enlarged front elevation view of the area "13" encircled in FIG. 12.

DETAILED DESCRIPTION OF THE PREFERRED EMBODIMENTS

Figure 9:
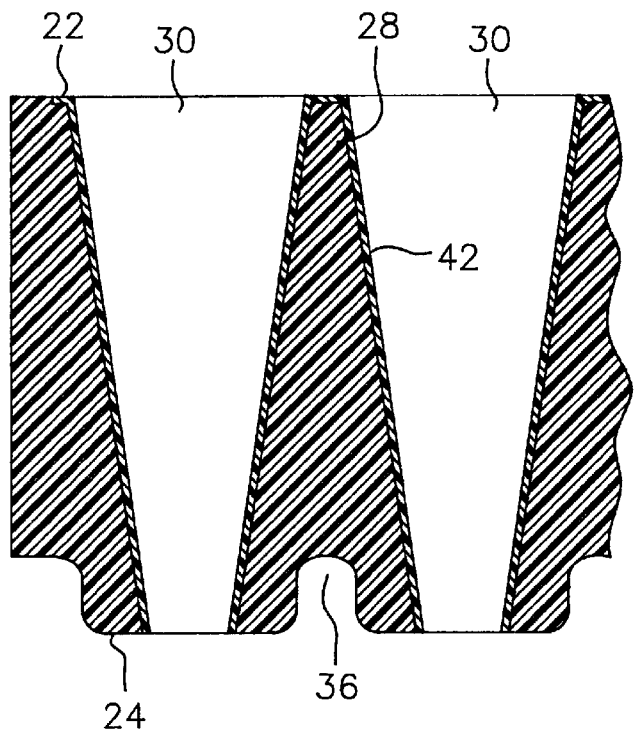
FIG. 9 illustrates a cross sectional view of a portion of a molded plant tray having a hard plastic liner.
Figure 10:
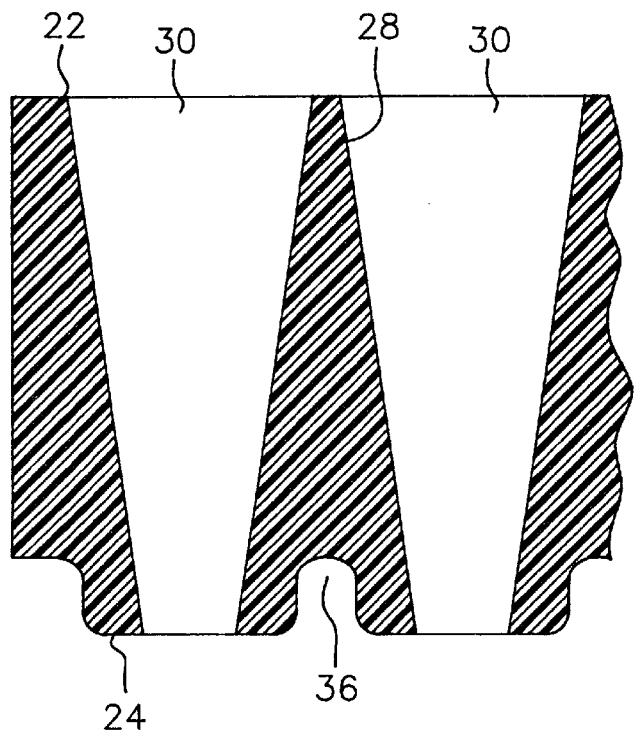
FIG. 10 illustrates a cross sectional view of a portion of a molded plant tray without a hard plastic liner.

FIG. 4 illustrates a first embodiment of the invention comprising a plant tray in the form of a solid foamed polystyrene body member 20 having a top surface 22, a bottom surface 24, side walls 26, end walls 27 and intermediate walls 28.

A plurality of seedling plant cells 30 are defined in between intermediate walls 28 and side walls 26, and extend downwardly from top surface 22 to bottom surface 24. The portions of intermediate walls 28 and side walls 26 that define plant cells 30 are tapered inwardly from top surface 22 to bottom surface 24 and have a lower termination at a drain hole 32 defined by the lower edge of intermediate walls 28 and side walls 26 in a manner similar to that of Todd, U.S. Pat. No. 3,667,159. Upper openings 34 for receiving planting medium are defined by a substantially square rim formation of uniform width common to adjoining plant cells 30 and forming a rectangular grid or lattice locating individual plant cells 30.

Figure 14:
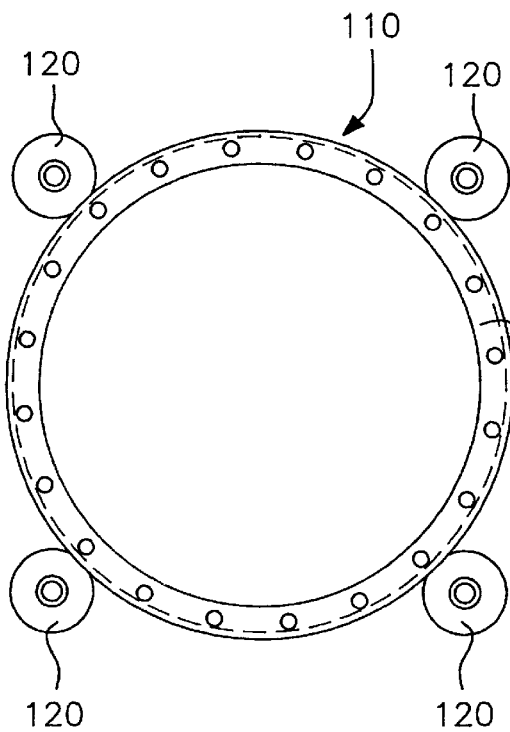
FIG. 14 is an end elevation view of the indexing drum illustrating its manner of support by support rollers.
Figure 15:
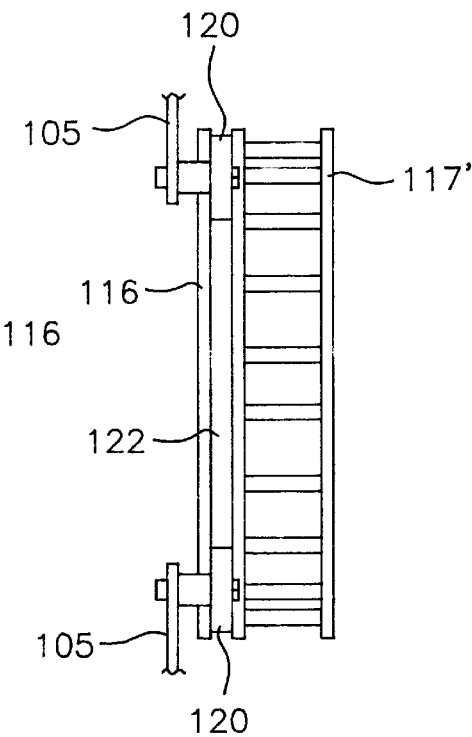
FIG. 15 is a front elevation view of one end of the indexing drum and its support rollers.

An indexing drum 110 forming no part of this invention is used for engaging the inventive plant flats herein for indexing them row by row through an automatic transplanter apparatus which removes the plants from the flat for subsequent transplanting. Indexing drum 110 is formed from a plurality of parallel indexing rods 112 that are arranged in spaced parallel relationship into a drum shape and held together by circular end rings 114 and 116, an interior ring 117' and mid ring 118 as shown in FIG. 12. Indexing drum 110 is supported by 8 rollers 120 (4 at each end) as shown in FIGS. 14 and 15. Rollers 120 engage in a machined slot 122 around the circumference of end rings 114 and 116 at each end of indexing drum 110 in the manner shown in FIG. 15.

Integral drive member receiving groove means 36 as shown in FIG. 4, are provided in the form of U-shaped grooves 36 extending along the bottom portions of intermediate walls 28 and end walls 27. Each drive member receiving groove means 36 has a center axis extending along bottom surface 24 of body member 20. The center axes of drive member receiving groove means 36 are parallel to each other and spaced equidistant from each other. Drive member receiving groove means 36 are shaped so as to spread driving forces transmitted to flat body member 20 by indexing rods 112 of indexing drum 110 out over a large surface area, and to thereby allow for the use of a relatively low strength material for the plant tray when used with an automatic transplanter.

In the embodiment of the present invention shown in FIGS. 1–4, transverse grooves 38 are provided along the lower portions of intermediate walls 28 and side walls 26 perpendicular to drive member receiving groove means 36 and also positioned parallel to each other and equidistant from each other.

In the embodiment of the present invention shown in FIGS. 5 and 7, transverse grooves 38 are not employed and only one set of parallel drive member receiving groove means 36 is used; a single transverse alignment groove 40 is provided along the lower portion of a single intermediate wall 28 and two side walls 26 opposite from each other, and is located equidistant from two parallel end walls 27 that are perpendicular to the two parallel side walls 26 at each end of alignment groove 40, so as to bisect drive member receiving groove means 36. The U-shaped profile of alignment groove 40 is designed to mate with the outer periphery of mid ring 118 of indexing drum 110 thereby providing means for consistent accurate placement of flat body member 20 relative to the axis of indexing drum 110.

Figure 11:
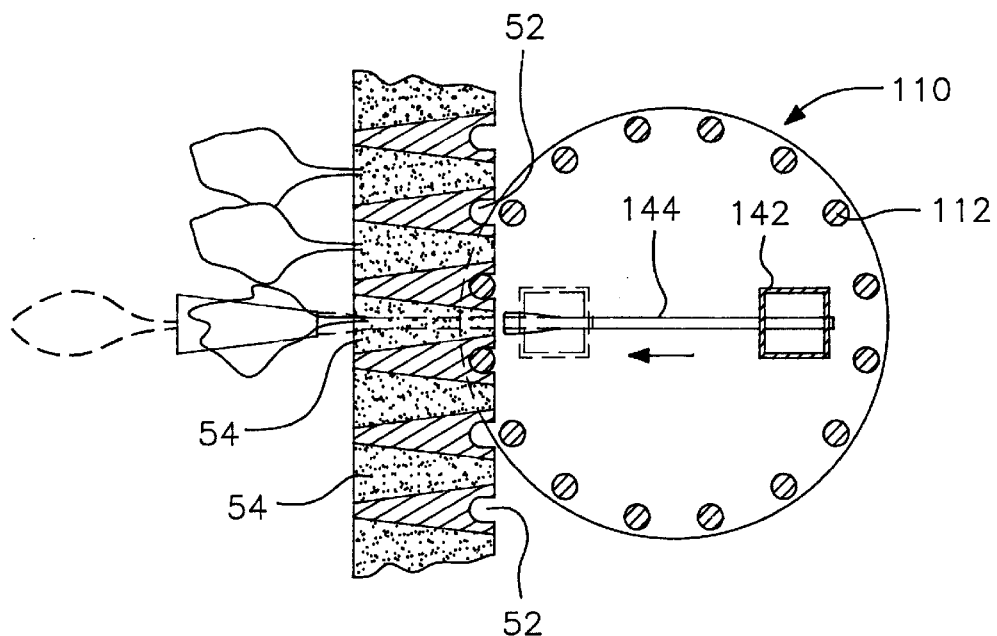
FIG. 11 is a sectional view through a plant flat and an associated indexing drum illustrating the manner in which the indexing drum engages the plant flat for driven index movement.

As shown in FIGS. 3 and 7 the centers of drain holes 32 are positioned along parallel center lines which are equidistant from each other. The central axes of drive member receiving groove means 36 are parallel to the drain hole center lines and spaced equidistant from the drain hole center lines. This arrangement ensures that drive member receiving groove means 36 as well as alignment groove 40 provide datum surfaces for consistent accurate positioning of drain holes 32 relative to the indexing drum indexing rods 112. This feature ensures that plant seedling ejection means 142, 144 mounted for axial movement inside indexing drum 110 will consistently enter drain holes 32 for ejection of plant seedlings during the operation of the automatic transplanter in the manner shown in FIG. 11.

As shown in FIG. 9, a hard plastic sheet 42 can be provided over the portions of intermediate walls 28 and side walls 26 defining plant cells 30. Such a hard plastic sheet can be formed from, but not limited to, U-V inhibited polystyrene sheet. This hardened plastic sheet can be bonded to body member 20 through the use of adhesives or fused to expandable polystyrene body 20 during manufacture. Some of the advantages gained by the addition of hard plastic sheet 42 are the increase in strength of the plant tray, the creation of a layer impervious to root growth, and the prevention of harmful organisms from penetrating the plant tray and being retained therein so as to be able to infect any new batch of seedlings planted in the tray. Furthermore, hard plastic sheet 42 makes it easier to sanitize the plant tray and also prevents the accumulation of chemicals such as fertilizers in the plant tray. The smooth surface of hard plastic sheet 42 also allows for easier plant removal when the tray is used in an automatic transplanting mechanism.

What is claimed is:

1. A molded plant tray comprising a main body member having a top surface, a bottom surface and a plurality of side walls extending between said top surface and said bottom surface;

a plurality of intermediate walls interconnecting said side walls and positioned in substantially perpendicular relationship to said side walls with a plurality of open-ended plant cells defined between said intermediate walls and said side walls;

said plant cells being arranged in a rectangular grid and each including a drain hole located at the bottom surface of said main body member and a plant medium receiving opening located at the top surface of said main body member;

drive member receiving groove means being defined on the bottom surface of said main body member by portions of said intermediate walls and portions of said side walls; and alignment means being defined on the bottom surface of said main body member by portions of said intermediate walls and portions of said side walls;

wherein said main body member is formed of relatively light foamed plastic and further including a hard plastic insert matingly fitted in said main body member for providing plant cells defined by said hard plastic insert.

2. The molded plant tray of claim 1 wherein portions of said intermediate walls and of said side walls defining each of said plant cells converge inwardly from the top surface of said main body member to the bottom surface of said main body member, terminating at their lowermost extent in said drain holes.

3. The molded plant tray of claim 2 wherein said drive member receiving groove means comprise a plurality of parallel U-shaped grooves each having a central axis, and wherein said alignment means comprises a U-shaped groove having a central axis perpendicular to the central axes of said drive member receiving groove means.

4. The molded plant tray of claim 1 wherein said drain holes are arranged so that their centers lie along parallel drain hole center lines; and said drive member receiving groove means comprise a plurality of U-shaped grooves each having a central axis and being located with their central axes spaced equidistant from each other and equidistant from respective drain hole center lines positioned in between said drive member receiving groove means.

5. The molded plant tray of claim 4 wherein said alignment means comprises a U-shaped groove having a central axis perpendicular to the central axes of said drive member receiving groove means and located equidistant from two parallel sidewalls of said main body member.

* * * * *